Dec. 15, 1925.　　　　　　　　　　　　　　　　　1,565,900
T. E. BRALEY
PISTON
Filed Aug. 6, 1925
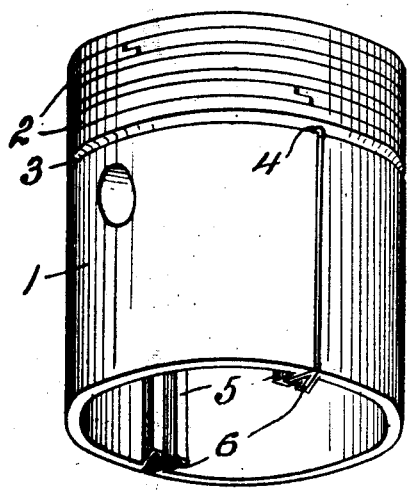
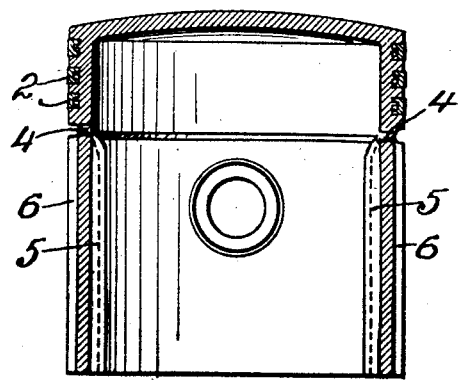
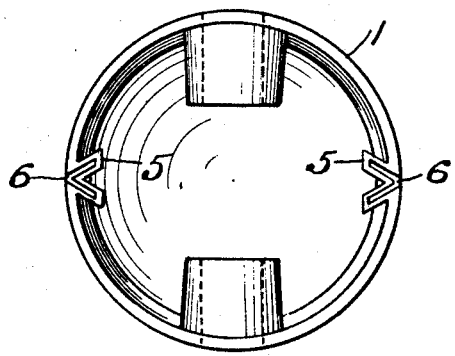
INVENTOR.
Thomas E Braley
BY
Warren D. House
His ATTORNEY.
Witness:
R. I. Hamilton Patented Dec. 15, 1925.

1,565,900

UNITED STATES PATENT OFFICE.

THOMAS E. BRALEY, OF WICHITA, KANSAS, ASSIGNOR OF ONE-HALF TO JOEL E. DAVIS, OF WICHITA, KANSAS.

PISTON.

Application filed August 6, 1925. Serial No. 48,539.

*To all whom it may concern:*

Be it known that I, THOMAS E. BRALEY, a citizen of the United States, and a resident of Wichita, in the county of Sedgwick and State of Kansas, have invented a certain new and useful Improvement in Pistons, of which the following is a specification.

My invention relates to improvements in pistons. It is particularly well adapted for use in pistons of explosive engines.

One of the objects of my invention is to provide a novel piston, which effects uniform lubrication, which reduces liability of scoring and looseness in the cylinder, which is simple, cheap, durable, not liable to get out of order, and which is efficient.

The novel features of my invention are hereinafter fully described and claimed.

In the accompanying drawing, which illustrates the preferred form of my invention, Fig. 1 is a perspective view of my improved piston.

Fig. 2 is a central longitudinal sectional view of the same.

Fig. 3 is an end view of the same.

Similar reference characters designate similar parts in the different views.

1 designates the body of the piston which is hollow and which has a closed inner end and an open outer end, and which adjacent to the inner end is provided with packing rings 2.

The outer periphery of the piston body 1, at the outer side of the rings 2, is provided with an annular groove 3 which communicates with the interior of the body 1 by one or more passages 4 through which · oil is adapted to pass.

The inner periphery of the body 1 is provided with one or more, preferably with two diametrically opposite longitudinal ribs 5, the arms of which have a certain degree of flexibility and which diverge inwardly, thereby imparting to the rib a V shape in cross section.

The rib 5 extends to the open end of the body 1 and has in it a V-shaped groove 6, which terminates at the outer periphery of the body 1 and communicates with the annular groove 3, the arms of the groove 6 extending respectively into the arms of the rib 5 and to the open end of the body 1.

The grooves 3 and 6 and the passages 4 afford even distribution of oil to the outer periphery of the body 1.

The grooves 6 afford the additional function of giving a limited amount of flexibility to the arms of the ribs, the inwardly flaring disposition of the arms of the rib further accentuating this flexibility, which permits the outer end portion of the body to be compressed, when inserted into the cylinder in which it is to operate, thus eliminating liability of looseness of the piston in the cylinder, and reducing liability of scoring of the outer periphery of the piston.

I do not limit my invention to the structure shown and described as modifications, within the scope of the appended claims, may be made without departing from the spirit of my invention.

What I claim is:—

1. A hollow piston having on its inner periphery a longitudinal rib V-shaped in cross section extending to one end of the piston, the arms of the rib being flexible and diverging inwardly, the rib having in it a longitudinal V-shaped groove the apex of which terminates at the outer periphery of the piston and the arms of which respectively extend into said arms of said rib.

2. A hollow piston having an annular groove in its outer periphery and having on its inner periphery a longitudinal rib V-shaped in cross section extending to one end of the piston, the arms of the rib being flexible and diverging inwardly, the rib having in it a longitudinal V-shaped groove the apex of which terminates at the outer periphery of the piston and which communicates with said annular groove, the arms of said V-shaped groove respectively extending into said arms of said rib.

In testimony whereof I have signed my name to this specification.

THOMAS E. BRALEY.